United States Patent [19]

Johnson, III

[11] Patent Number: 4,884,916
[45] Date of Patent: Dec. 5, 1989

[54] SYSTEM FOR MOUNTING A POWER TRANSMISSION MEMBER TO A SHAFT

[75] Inventor: Harold R. Johnson, III, Aberdeen, Ohio

[73] Assignee: Emerson Electric Co., St. Louis, Mo.

[21] Appl. No.: 289,249

[22] Filed: Dec. 23, 1988

[51] Int. Cl.⁴ ............................ B25G 2/00; B25G 3/20
[52] U.S. Cl. .................................... 403/370; 403/371
[58] Field of Search ................. 403/370, 371, 16, 374

[56] References Cited

U.S. PATENT DOCUMENTS

| | | | |
|---|---|---|---|
| 827,346 | 7/1906 | Bubb | 403/371 |
| 2,610,515 | 9/1952 | Williams | 403/371 X |
| 2,696,997 | 12/1954 | McCloskey | 403/371 X |
| 2,849,886 | 9/1958 | McCloskey | 403/370 X |
| 4,304,502 | 12/1981 | Stratienko | 403/371 X |
| 4,475,842 | 10/1984 | Araya et al. | 403/370 |
| 4,626,114 | 12/1986 | Phillips | |
| 4,697,675 | 10/1987 | Johnson, III | |

OTHER PUBLICATIONS

Falk Bulletin 521-110-Falk Sime Fluid Couplings, Falk Corp., Milwaukee, Wisc., 1982.

Primary Examiner—Dennis L. Taylor
Assistant Examiner—Carol I. Bordas
Attorney, Agent, or Firm—Polster, Polster and Lucchesi

[57] ABSTRACT

A structural mounting assembly for mounting a power transmission member, such as the disk portion of a gear, to a shaft wherein the disk portion has an open-ended quill extending therethrough sized to snugly receive a bushing that has one end adapted to snugly receive the extremity of the shaft and the other end arranged to be connected to an adapter mountable at the other open end of the quill.

16 Claims, 2 Drawing Sheets

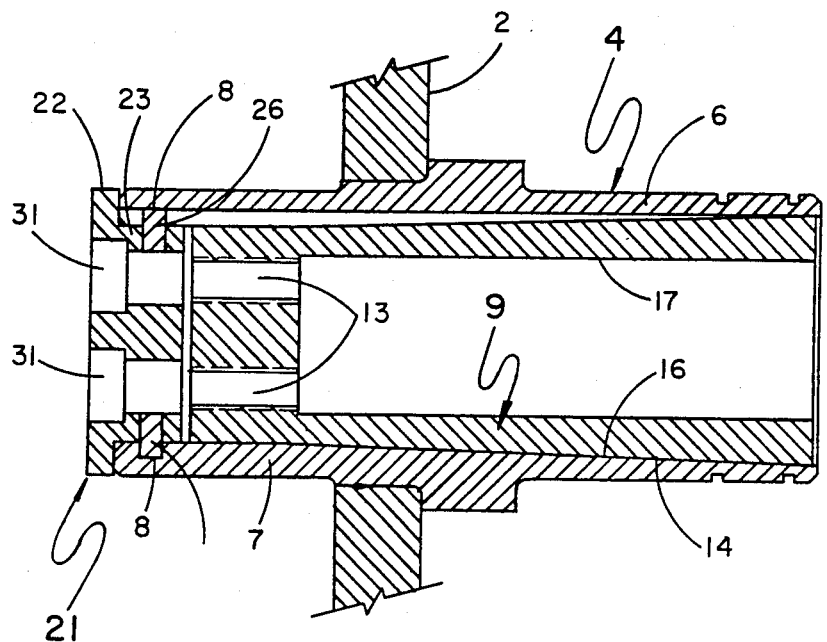
FIG. 2
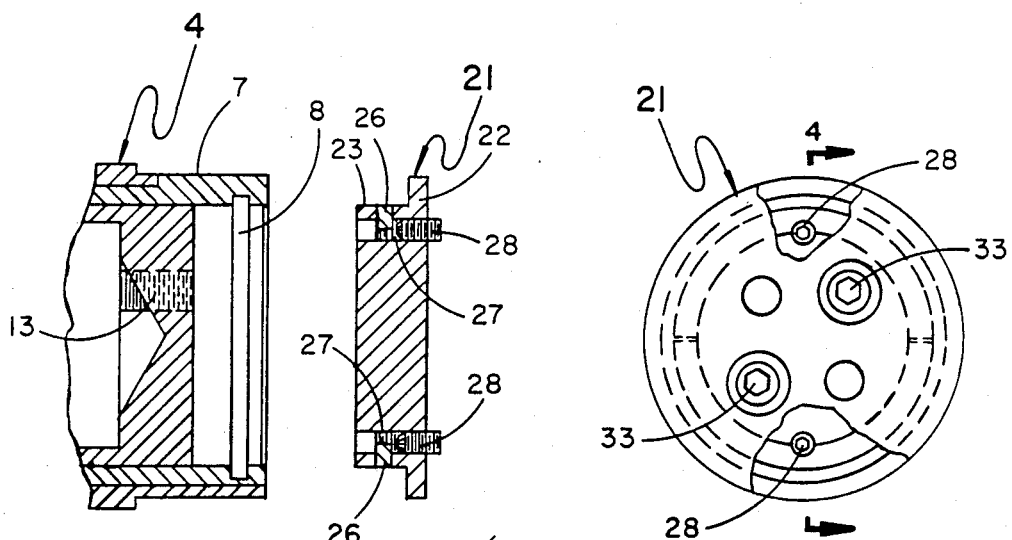
FIG. 4
FIG. 3

SYSTEM FOR MOUNTING A POWER TRANSMISSION MEMBER TO A SHAFT

BACKGROUND OF THE INVENTION

The present relates to a system for mounting a power transmission member to a shaft and more particularly to a system for mounting an open-ended quill of a power transmission member in the form of a gear to one end of a rotatable shaft.

In the prior art, it is well known to connect a power transmission member in the form of a gear to one end of a rotatable shaft through an internally tapered hollow quill member fixed to and passing through the disk portion of the gear by providing an externally and matingly tapered bushing mounted on the shaft end which engages with the internally tapering quill in snug contacting relation, the engaging quill and bushing having spaced opposed flanges at corresponding ends thereof which are adjustably bolted together, attention being directed to recently issued U.S. Pat. No. 4,626,114, issued to A.E. Phillips on Dec. 2, 1986, and to U.S. Pat. No. 4,697,675, issued to Harold R. Johnson III et. al. on Oct. 6, 1987. It also is known to provide similarly matingly tapered and engaging, shaft mountable quill and bushing members in fluid couplings such as disclosed at page 18 of the Falk Bulletin 521-110, entitled Falk Sime Fluid Couplings, copyrighted by the Falk Corporation, Milwaukee, Wis., 1982, 1985. In fact, in the FIG. disclosed at page 18 of this bulletin, both the matingly tapered and engaging quill and bushing members are each closed at corresponding integral ends and are longitudinally adjustable by a connecting threaded screw which projects through an externally projecting stem forming part of the integral closure end of the quill member. These aforementioned structures of the prior art neither recognized nor solved some of the tight clearance problems which quite often arise in various shaft-power transmission member connections, such as the frequent clearance problems which arise in the connection of a shaft mount reducer to a shaft to allow positioning of the shaft mount reducer in closer proximity to an existing wall and thus both efficiently utilize and conserve space. The present invention, both recognizing and resolving these problems in space limitation and conservation, provides a unique and novel system for mounting a power transmission member to a shaft end which is straightforward, economical and efficient in manufacture and assembly, requiring a minimum of parts and utilizing existing quill and bushing parts, including the previously desired features of a mating tapered quill and bushing assembly and yet conserving space in the surrounding assembly environment. Not only does the structural assembly of the present invention permit rapid, reverse mount assembly in a limited or restricted space environment, but, in addition, the present invention provides for quick disassembly of the quill and bushing members for use of one or more of such parts in other arrangements.

Various other features of the present invention will become obvious to one skilled in the art upon reading the disclosure set forth herein.

SUMMARY OF THE INVENTION

More particularly, the present invention provides a structural mounting assembly for mounting a power transmission member of a mechanical drive on a rotational shaft comprising: a longitudinally extending hollow quill mounted to and extending through the face of the power transmission member, the quill being open at opposite ends thereof; a longitudinally extending hollow bushing sized and adapted to be inserted through one end of the hollow quill with the outer bore of the bushing snugly engaging the inner bore of the hollow quill and the inner bore of the bushing being sized and adapted to snugly receive one end of the shaft, the bushing including a cross-member fixed to and extending across one end thereof; rotational restraining means extending between the inner bore of the quill and the outer bore of the bushing and the inner bore of the bushing and the peripheral surface of the shaft to maintain the quill, bushing and shaft in fixed rotational relation along the longitudinal axis of the shaft; and, an adapter removably mounted at the opposite end of the hollow quill to be connected to the cross-member of the bushing to restrain longitudinal movement therebetween. In addition, the adapter member of the present invention has a unique plug and flange configuration with a novel detent and recess arrangement and a novel arrangement for both connecting and disconnecting the quill and bushing members, allowing usage of conventional quill parts and employment of the feature of mating tapering between bushing and quill.

It is to be understood that various changes can be made by one skilled in the art in one or more of the several parts of the invention disclosed herein without departing from the scope or spirit of the present invention. For example, one or more keys can be employed to restrain relative rotational movement between shaft, bushing and quill, and the key and slot assembly can be tapered to facilitate snug engagement.

BRIEF DESCRIPTION OF THE DRAWINGS

Referring to the drawings which disclose one advantageous embodiment of the invention:

FIG. 2 is a cross-sectional view of the assembled quill and bushing of FIG. 1;

FIG. 3 is an end view of the adapter of FIG. 2; and

FIG. 4 is a cross-sectional, exploded view taken in a plane through line 4—4 of FIG. 3 of a portion of the quill, a portion of the bushing and the adapter prior to reverse mount assembly.

DETAILED DESCRIPTION OF THE INVENTION

Figure 1:
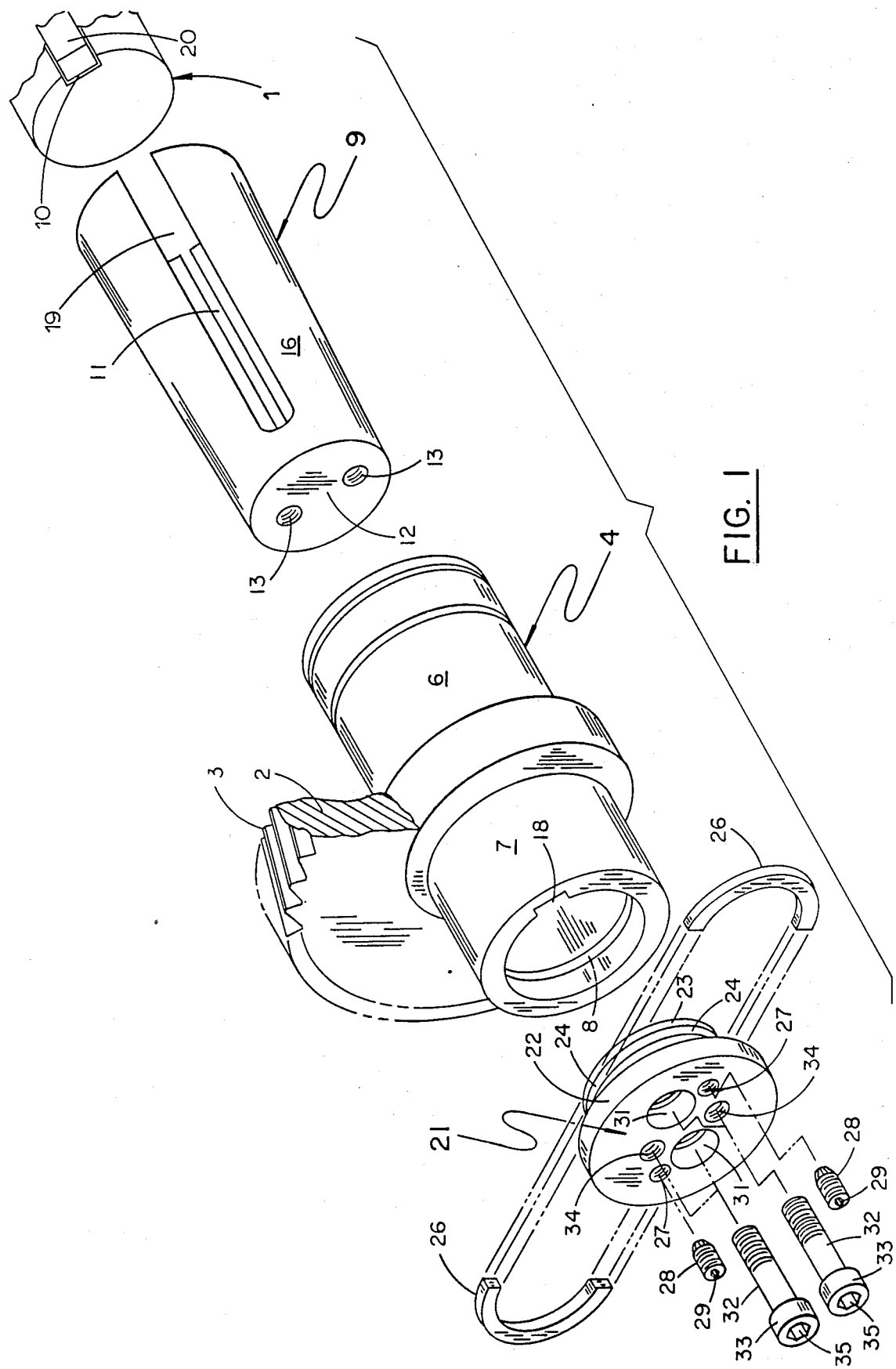
FIG. 1 is an exploded isometric view of the several parts of the inventive power transmission mounting system disclosing a portion of a slotted drive shaft and key associated therewith.

Referring to the exploded isometric view of FIG. 1, the several parts of the inventive structural mounting assembly are isometrically disclosed. In this FIG. 1, the structural assembly for mounting a transmission member of a mechanical drive on a rotational shaft is disclosed in the form of a solid disk portion 2 having peripheral gear 3 integral therewith with a longitudinally extending, hollow, open-ended quill 4 fixed to disk portion 2 to extend centrally and normally therethrough. The hollow, longitudinally extending quill 4 includes a first portion 6 shown as extending a longer preselected longitudinal distance from one face of disk portion 2 of gear 3 than the extending longitudinal distance of the remaining second portion 7 of quill 4 from the opposite face of disk portion 2. It is to be understood that the structural mounting assembly of the present invention is not limited to the particular gear type power transmission arrangement disclosed but that such an inventive structural mounting assembly can be employed with other types of power transmission members to be mounted on rotational shafts, such as pulley sheaves or idlers, without departing from the scope of the invention. Further, the relative geometric configuration and positioning between quill member and power transmission member can be varied as the particular occasion might require.

As can be seen in FIGS. 1, 2 and 4 of the drawings, the portion 7 of quill 4 is provided with an annular internal groove 8 positioned a preselected distance from the outer extremity thereof. This annular internal groove 8 which serves a definite function, as described hereinafter, in conjunction with the inventive reverse mount arrangement disclosed, is to be conveniently found present in past direct mount arrangements, serving to accommodate pulling tools which have been utilized to separate quill shaft and bushing in such direct mount arrangement. Thus, the present invention permits a certain amount of universality in quill selection, allowing the same quill part to be used either in a direct mount arrangement or in the inventive reverse mount arrangement described herein.

Referring again to FIG. 1 of the drawings, arranged to be inserted in longitudinally extending longer portion 6 of hollow quill 4 is a longitudinally extending hollow bushing 9 which is sized and adapted to be inserted through the open end of portion 6 of quill 4 a preselected longitudinal distance from the opposite end of the remaining portion 7 of the hollow, open ended quill 4. It is to be noted that bushing 9 is provided with a longitudinally extending compression slot or split 11 which extends substantially the length of bushing 9 and which serves to enhance a snug shaft gripping function when the bushing 9 is mounted on a rotational shaft end through the open end of the hollow bushing during assembly operations. The opposite end of bushing 9 is provided with a cross member which is disclosed as being in the form of an integral closing cap 12 extending across such end of bushing 9. Cap 12 is provided with two spaced and internally threaded taps or apertures 13 which serve to receive a pair of threaded screw members described hereinafter.

Referring to FIG. 2 of the drawing, it can be seen that hollow quill 4 is provided with a tapered inner bore 14 which extends longitudinally along the quill to converge inwardly toward the axis of rotation of the assembly from one open end of quill 4 toward the other end. In turn, hollow bushing 9 (FIG. 1) has an outer tapered peripheral surface 16 which extends longitudinally along the bushing to converge inwardly also toward the axis of rotation of the structural assembly from the open end of bushing 9 toward closed cap end 12. Bushing 9 is thus received in quill 4 with the outer tapered peripheral surface 16 of bushing 9 contacting in snug fit relation with the tapered inner bore 14 of quill 4, the inner bore 17 of hollow split bushing being uniform throughout and sized and cross-sectionally adapted relative the burr-free end of a rotational shaft to which it is to be coupled to snugly grip such shaft end (not shown).

Rotational restraining means extends between the inner bore of quill 4, the outer bore of bushing 9, the inner bore 17 of the bushing and the drive shaft 1 (partially shown in FIG. 1) to maintain the quill 4, bushing 9 and shaft 1 to which it is to be mounted in fixed rotational relation along the longitudinal axis of the shaft.

To accomplish this, quill 4 can be provided with a key slot 18 extending longitudinally therethrough, bushing 9 with an appropriately sized and mating longitudinally extending through key slot 19 (FIG. 1) and the shaft end of drive shaft 1 with an appropriately sized and mating, longitudinally extending key slot 10 to be held in rotational restraining relation by a suitably sized and matingly engaging longitudinal key member 20. In this regard, it is to be understood that other types of rotational restraining members besides the aforedescribed key and slot arrangement can be provided between quill, bushing and shaft to restrain relative rotational movement therebetween without departing from the scope or spirit of the present invention.

As can be seen in the drawings, particularly FIGS. 1, 3 and 4 thereof, an adapter 21 is removably mounted at that end of quill 4 opposite the end portion 6 of the quill into which the shaft and intermediate tapered bushing 9 are nested, namely the end of the second remaining portion 7 in which internal annular groove 8 is located and which, as aforementioned, is shorter than shaft receiving portion 6 of quill 4. This adapter 21 can be connected to the aforedescribed cross member or cap 12 of bushing 9 to restrain longitudinal movement therebetween. Adapter 21 includes a flange portion 22 and an integral plug portion 23 which are sized so that plug portion 23 removably engages snugly with the internal bore open at the end of the second remaining shorter portion 7 of quill 4 with the extremity of plug 23 being located adjacent closure cap 12 of bushing 9 upon assembly and the inner face of flange portion 22 abutting the extremity of quill 4 adjacent the opening of shorter portion 7. The plug portion 23 is, provided with an annular peripheral groove 24 extending therearound which is positioned on plug portion 23 a preselected distance from flange portion 22 to be aligned with the internal annular groove 8 in the inner bore of the shorter portion 7 of quill 4. A pair of substantially semi-circular ring members 26 can be disposed in opposed mirror-image relation in annular peripheral groove 24.

As can be seen in FIGS. 1 and 4 of the drawings, adapter 21 includes two spaced, longitudinally extending, internally threaded apertures 27 therein which pass through both the flange portion 22 and plug portion 23 of adapter 21 to allow threaded passage therethrough of a pair of externally threaded holding or set screws 28. Each of these screws 28 can be slightly tapered at one extremity thereof and slotted or knurled to serve as the holding extremity to abut the face of and hold one of rings 26 in annular peripheral groove 24 during installation of plug portion 23 of adapter 21 into the opening of quill 4. Once the annular peripheral groove 24 is in alignment with annular internal groove 8, holding or set screws 28 can be backed off and the assembly selectively rotated to permit respective radial movement of the unrestrained semicircular rings 26 into engagement with the aligned internal annular groove 8 of quill 4. Each of set screws 28 can be again selectively rotated inwardly to hold each ring 26 tightly in engagement with annular groove 8 to provide a suitable detent to arrest longitudinal movement between quill 4 and adapter 21. It is to be understood that the opposite extremity of each screw 28 can be provided with an appropriate aperture 29 of suitable cross-section, such as hexagonal, for insertion of an end of a suitable, mating, turning wrench to adjust the screws. It also is to be understood that the present invention is not to be considered as limited to the particular semi-circular ring pair restraining or detent arrangement above described but that other arrangements —such as radially moveable, spring-loaded detents or levered, radial moveable bolts, cams or keepers —can also be used to hold adapter 21 in mounted position at the quill end of shorter portion 7.

Adapter 21 also includes a first pair of spaced longitudinally extended and countersunk unthreaded apertures 31 therein (FIGS. 1, 2 and 3) which extend through the flange portion 22 and plug portion 23 thereof and which are axially aligned with the aforedescribed spaced threaded apertures 13 in cap 12 to allow free passage of the shank portions of externally threaded fastening screws 32 to threadedly engage in male-female relation with apertures 13 with heads 33 of screws 32 engaging in the countersunk portion of the apertures 31. In this regard, the head portions 33 of screws 32, like the extremities of screws 28, can be provided with appropriate hexagonal slots 35 for turning wrench engagement therewith. With such screw engagement connecting the bushing cap 12 to adapter 21, longitudinal movement of bushing 9, relative adapter 21 and quill 4, is restrained with the tapered inner bore 14 of quill 4 being held in snug contacting relation with the matingly tapered peripheral section 16 of split bushing 9 to firmly grip a rotational shaft end inserted into the inner bore 17 of bushing 9 and keyed to both quill and bushing.

Adapter 21 further includes a second pair of spaced apertures 34 equally sized in cross-section to the first pair of apertures 31. These apertures 34 are internally threaded to allow the shank portions of threaded screws 32 alternatively to be threaded therethrough with the extremities of the shank portions abutting cap end 12 of bushing 9 to initiate relative releasing movement between the matingly tapered bushing 9 and quill 4 when they have been matingly and snugly assembled.

In an assembly installation of the above described inventive structural mounting assembly to a known, typical shaft mounted reducer (not shown) to adapt such reducer to a drive shaft in a critical space mounting application, the drive shaft onto which the shaft mount reducer is to be mounted is rotated so that the keys or slot and key of the shaft are in the upward position. Reverse mount bushing 9 is then keyed to the shaft key along bushing key slot 19. Adapter 21 is then prepared to be mounted to the short portion of a suitably sized quill, such as hollow, open-ended quill 4 and short portion 7 thereof, which quill 4 with gear 3 and disk 2 has been incorporated into the shaft mount reducer to be connected to a drive shaft. The semi-circular rings 26 are mounted in mirror-image relation into engaging relation with the annular peripheral groove 24 on the plug portion 23 of the adapter 21. Threaded set or holding screws 28 in the adapter are then tightened to hold rings 26 snugly in annular peripheral groove 24 and the plug portion 23 of adapter 21 is positioned into the shorter portion 7 of the quill 4 with the flange portion 22 abutting against the peripheral extremity of shorter portion 7. Adapter 21 is then rotated to a six o'clock position so that one of the set screws 28 holding a ring 26 is at the bottom of the adapter 21. This screw 28 is then loosened to allow such ring 26 to fall into the aligned internally annular groove 8 on the bore of portion 7 of quill 4. The set screw 28 is then tightened to keep this ring 26 in position in groove 28. The operation is then repeated for the other ring 26 with both set screws 28 being torqued to the proper value to ensure that the rings are fully seated in annular groove 8 and that adapter 21 is firmly mounted to the extremity of short portion 7 of quill 4. The shaft mount reducer containing gear 3 and an adapter 21 in place on quill 4 is then installed with its first portion 6 engaging bushing 9 with the key engaging longitudinally extending key slot 18 in the inner bore of quill 4. Apertures 31 of adapter 21 are aligned with the threaded apertures 13, and screws 32 are inserted and torqued to the desired level to firmly connect the bushing 9 to adapter 21 and quill 4.

To remove the assembly, the shaft mounted reducer holding gear 3 is properly supported by a lifting lug to handle the weight of the reducer. Both screws 32 in adapter 21 are loosened from threaded apertures 13 with one screw 32 being completely removed and the second being loosely held in its aperture 13 to prevent relative rotation between adapter 21 and bushing 9. The completely removed screw 32 is threadedly inserted into one of the internally threaded spaced apertures 34 and tightened until the tapered inner bore of quill 4 is released from the matingly tapered bushing 9. If it proves difficult to separate the quill and bushing, a third externally threaded screw 32 can be inserted into the other internally threaded aperture 34 and the two screws 32 tightened alternatively until release has been accomplished.

Thus, with the inventive, comparatively straightforward and economical structural assembly above described, it is possible to reversedly mount a power transmission member, such as a gear in a shaft mount reducer to a rotatable shaft in an efficient manner and in a confined space which might not readily accommodate prior art directly connected flange mounts.

The invention claimed is:

1. A structural mounting assembly for mounting a power transmission member of a mechanical drive on a rotational shaft comprising:
   a longitudinally extending hollow quill mounted to and extending through the face of said power transmission member, said quill being open at opposite ends thereof;
   a longitudinally extending hollow bushing sized and adapted to be inserted through one end of said hollow quill with the outer bore of said bushing snugly engaging the inner bore of said hollow quill and the inner bore of said bushing being sized and adapted to snugly receive one end of said shaft, said bushing including a cross-member fixed to and extending across one end thereof;
   rotational restraining means extending between the inner bore of said quill and the outer bore of said bushing and the inner bore of said bushing and the peripheral surface of said shaft to maintain said quill, bushing and shaft in fixed rotational relation along the longitudinal axis of said shaft; and
   an adapter removably mounted at the opposite end of said hollow quill to be connected to said cross-member of said bushing to restrain longitudinal movement therebetween.

2. The structural mounting assembly of claim 1, said hollow quill extending normal to said face of said power transmission member with its longitudinal axis extending along the axis of rotation of said power transmission member.

3. The structural mounting assembly of claim 1, said rotational restraining means comprising mating key and slot fittings extending longitudinally along the inner bore of said hollow quill, the wall of said bushing and along the outer peripheral surface of said shaft.

4. The structural mounting assembly of claim 1, said quill having a tapered inner bore extending longitudinally along said quill and converging inwardly toward the axis of rotation of said assembly from an open end of said quill toward the other end and said bushing having an outer tapered bore extending longitudinally along said bushing and converging inwardly also toward the axis of rotation of said structural assembly from the open end of said bushing toward said cross-member end to be received within said quill with the outer tapered surface of said bushing contacting in snug fit with the tapered inner bore surface of said quill.

5. The structural mounting assembly of claim 1, said hollow quill extending from opposed faces of said power transmission member with the portion of said quill closest to the cross-member end of said bushing when assembled being of lesser length than the portion closest to the opening of said bushing to maximize assembly clearance for said adapter member along one face of said power transmission member.

6. The structural mounting assembly of claim 1, said adapter including means cooperable with said quill to restrain relative longitudinal movement therebetween.

7. The structural mounting assembly of claim 1, said adapter including actuating means to initiate relative releasing movement between said bushing and said quill in which said bushing is engaged.

8. The structural mounting assembly of claim 1, said adapter including means cooperable with said quill to restrain relative longitudinal movement therebetween and means to initiate relative movement between said quill and said bushing.

9. The structural mounting assembly of claim 1, said hollow quill and said adapter having peripherally interlocking moveable detent means cooperable therebetween to arrest longitudinal movement therebetween.

10. The structural mounting assembly of claim 1, said hollow quill having recess means extending along the inner bore of said quill at least at that end to which said adapter is removably mounted and said adapter having detent means moveable in a lateral direction normal to the axis of rotation of said assembly to engage with said recess means to arrest longitudinal movement therebetween.

11. The structural mounting assembly of claim 1, said adapter including integral flange and plug portions sized so that said plug portion removably engages with the internal bore opening of said hollow quill with the flange portion abutting said quill opening extremity.

12. The structural mounting assembly of claim 1, said adapter including at least one longitudinally extending countersunk aperture therein to allow passage of the shank portion of an externally threaded headed fastening screw therethrough to engage in male-female relation with an internally threaded aperture in said cross-member end of said bushing to connect said bushing cross-member to restrain longitudinal movement therebetween.

13. The structural mounting assembly of claim 1, said adapter including at least one longitudinally extending internally threaded aperture therein to allow threaded passage therethrough of the shank portion of an externally threaded activating screw with the extremity of said shank portion abutting said cross-member end of said bushing to initiate relative releasing movement between said bushing and said quill in which said bushing is engaged.

14. The structural mounting assembly of claim 1, said adapter including movable restraining means engageable with said quill to restrain relative longitudinal movement therebetween, said adapter including at least one longitudinally extending internally threaded aperture therein to allow threaded passage therethrough of the shank portion of an externally threaded holding screw to hold said moveable restraining means in engageable relationship with said quill.

15. The structural mounting assembly of claim 1, said adapter including integral flange and plug portions sized so that said plug portion removably engages with the internal bore opening of said hollow quill with the flange portion abutting said quill opening extremity, said plug portion having an annular peripheral groove extending therearound;
   at least two arcuate ring members sized to be disposed in cooperative opposed relation in said annular peripheral groove;
   said internal bore of said hollow quill including an annular groove positioned near said plug receiving opening to be aligned with said annular groove of said plug member to engagingly receive said arcuate ring members therein;
   said adapter including at least two spaced, longitudinally extending, internally threaded apertures therein to allow threaded passage therethrough of the shank portions of externally threaded holding screws to hold said ring members in a first position during assembly and in a second position when in engagement with said annular groove of said hollow quill.

16. A structural mounting assembly for mounting the disk portion of a gear on a rotational shaft comprising:
   a longitudinally extending, hollow, open-ended quill fixed to said disk portion to extend centrally and normally therethrough with the longitudinally extending quill member having a first portion extending a longer, preselected, longitudinal distance from one face of said disk portion than the extending longitudinal distance of said remaining second portion of said quill from the opposite face of said disk portion, said second portion having an annular internal groove positioned a preselected distance from the outer extremity thereof;
   a longitudinally extending, hollow, longitudinally split bushing sized and adapted to be inserted through the open end of said first portion of said hollow quill a preselected longitudinal distance from the opposite end of said remaining portion of said hollow, open-end quill, said opposite end of said bushing having a cap closing member integral therewith;
   said quill having a tapered inner bore extending longitudinally along said quill and converging inwardly toward the axis of rotation of said assembly from the open end of said quill toward the other end, and said hollow bushing having an outer tapered surface extending longitudinally along said bushing and converging inwardly also toward the axis of rotation of said structural assembly from the open end of said bushing toward said cap end to be received within said quill with the outer tapered surface of said bushing contacting in snug fit relation with the tapered inner bore surface of said quill;

said inner bore of said hollow split bushing being sized and adapted to snugly grip one end of said rotational shaft extending therein;

aligned key and slot fittings extending longitudinally along the inner bore of said hollow quill, through the wall of said bushing and along the outer peripheral surface of said rotational shaft;

an adapter mounted at the open end of the remaining shorter portion of said quill including integral flange and plug portions sized so that said plug portion removably engages snugly with the internal bore opening of said hollow quill with the plug extremity adjacent said cap closing member of said bushing and the flange portion abutting said quill opening extremity of said remaining shorter portion of said quill, said plug portion having an annular peripheral groove extending therearound a preselected distance from said flange portion to be aligned with said annular groove in the inner bore of said shorter portion of said quill;

a pair of substantially semi-circular ring members sized to be disposed in opposed relation in said annular peripheral groove of said plug member;

said adapter including two spaced, longitudinally extending, internally threaded apertures therein to allow threaded passage therethrough of externally threaded holding screws with tapered, peripherally slotted extremities to engage with and hold said ring members in a first position during assembly and in a second position when in radial engagement with said aligned annular groove of said hollow quill;

said adapter including a first pair of spaced, longitudinally extending, countersunk apertures therein to allow free passage of the shank portions of externally threaded headed fastening screws therethrough to respectively engage in male-female relation with a pair of equally spaced internally threaded apertures in said bushing cap to connect said bushing cap to restrain longitudinal movement between said bushing and said adapter;

said adapter further including a second pair of spaced apertures equally sized in cross-section to said first pair of apertures and internally threaded to allow the shank portions of said threaded fastening screws to alternatively be threaded therethrough with the extremities thereof abutting said cap of said bushing to initiate relative releasing movement between said bushing and said quill in which said bushing is snugly engaged in assembly.

* * * * *